INVENTORS
DAVID W. RABENHORST
KENNETH E. DARNELL

INVENTORS
DAVID W. RABENHORST
KENNETH E. DARNELL

Oct. 12, 1971   D. W. RABENHORST ET AL   3,611,652
THERMALLY TRANSPARENT ERECTABLE BOOM
Filed April 9, 1969   3 Sheets-Sheet 3

INVENTORS
DAVID W. RABENHORST
KENNETH E. DARNELL 3,611,652
THERMALLY TRANSPARENT ERECTABLE BOOM
David W. Rabenhorst, Silver Spring, and Kenneth E. Darnell, College Park, Md., assignors to the United States of America as represented by the Secretary of the Navy
Filed Apr. 9, 1969, Ser. No. 814,560
Int. Cl. E04h 12/34
U.S. Cl. 52—110                                    4 Claims

ABSTRACT OF THE DISCLOSURE

The present invention relates generally to erectable booms for space application. More specifically, the present invention provides an erectable boom characterized by increased strength, lighter weight, and relative immunity to thermal influences when compared to conventional tape booms. Although the "thermally transparent" boom of the present invention is lightweight and occupies less volume, a four-inch square unit will support bending moment orders of magnitude greater than can a conventional one-half inch diameter tape boom.

BACKGROUND AND SUMMARY OF THE INVENTION

Since the beginning of man's organized attempts to reach beyond the confines of his own planet, the utility of boom devices for space vehicles has been recognized. The great majority of space vehicles sent into the environs which surround the earth have used some type of boom, their function ranging from signal transmission to vehicle stabilization. Particularly useful have been erectable booms, that is, booms which are held in a restricted space during launch of a spacecraft and, on ejection of the spacecraft from the launch vehicle, are deployed from the craft. Such a boom is a necessity when it must be deployed to extend a substantial distance from the spacecraft, thus preventing the stowage of the full, extended length of the boom within the usually restricted space of the launch vehicle.

A proper consideration of spacecraft designers has continued to be a trade-off in component usefulness versus component weight. Until space vehicle propulsion means are no longer weight restricted, a primary requisite for spacecraft components will be high utility to weight ratios.

Energy requirements of space vehicles have also necessitated the use of power generation means which convert radiation incident on the vehicle to useable power. Solar cell arrays of various descriptions have been successfully utilized to this end. A major consideration here is the wattage to weight ratio attainable with a particular solar array. Shadowing of the array by the spacecraft or by components external to the craft decreases the power obtainable per pound of generation means, an undesirable condition.

The present invention solves the problems presented in the foregoing description in that it provides an erectable boom deployable in space which is extremely light in weight and yet serves its function as well as conventional booms now in use, and is effectively "thermally transparent," that is, the shadowing of solar radiation responsive means contained on the craft is held to an absolute minimum. More particularly, the invention disclosed herein provides an erectable boom having a central stem with mutually perpendicular struts held along the length of the stem, the ends of the struts being interconnected with thin tension wires. The invention is lightweight and occupies an extremely small volume, yet a four-inch square unit will support bending moment orders of magnitude greater than a conventional one-half inch diameter tape boom. Since the boom is effectively "transparent," all components are effectively in the sunlight. Therefore, it is relatively immune to thermal bending, a serious problem with prior boom devices.

Hence, the present invention provides an erectable boom characterized by increased strength, lighter weight, and relative immunity from thermal influences when compared to conventional tape booms, such advantageous provisions forming a primary object of the invention.

It is another object of the invention to provide an erectable and retractable boom which, although occupying an extremely small volume, is capable of supporting bending moments of suprisingly large magnitude.

It is also an object of the invention to provide a boom having high torsional stiffness which can accommodate items packaged at various locations along the boom.

It is similarly an object of the invention to provide a boom having a known, predictable and repeatable torsional alignment upon erection.

A further object of the invention is to provide an erectable boom having a controllable rate of deployment which, under light loading, is stable during deployment.

An additional object of the invention is the provision of a boom which has a crosswise projected area of less than one-tenth that of corresponding tape booms.

Other objects and advantages of the invention will become more readily apparent on reference to the following description of the preferred embodiments.

DESCRIPTION OF THE PREFERRED EMBODIMENTS

The lightweight erectable boom described hereinafter can be utilized for a variety of applications, both on the ground, such as an antenna erection device, or in space. The description herein will be primarily directed to the use of the invention as an erectable boom for spacecraft, an application for which the device has particularly advantageous application, as evidenced by the following characteristics:

(1) The boom is stiff, that is, a four-inch square unit will support bending moment orders of magnitude greater than a conventional one-half inch diameter tape boom;

(2) The boom is lightweight, a typical unit weighing about 0.008 pound per foot of length, excluding the erection means;

(3) The boom is effectively "thermally transparent," that is, it is practically immune to thermal bending;

(4) The boom occupies a small volume, requiring a stowage volume of less than one-half cubic inch per foot of extended length;

(5) The boom is controllably deployed and retracted;

(6) The boom has high torsional stiffness;

(7) The projected area of the boom is negligible, for example, the crosswise projected area is about one-sixth that of a conventional one-half inch diameter tape boom, thereby minimizing solar sail area and lessening solar cell "shadowing" problem;

(8) The boom structure allows packaging of items at various places along the boom; and (9) The boom, under light loading, is stable during deployment, requiring no turning or whipping of deployable mass.

Figure 1:
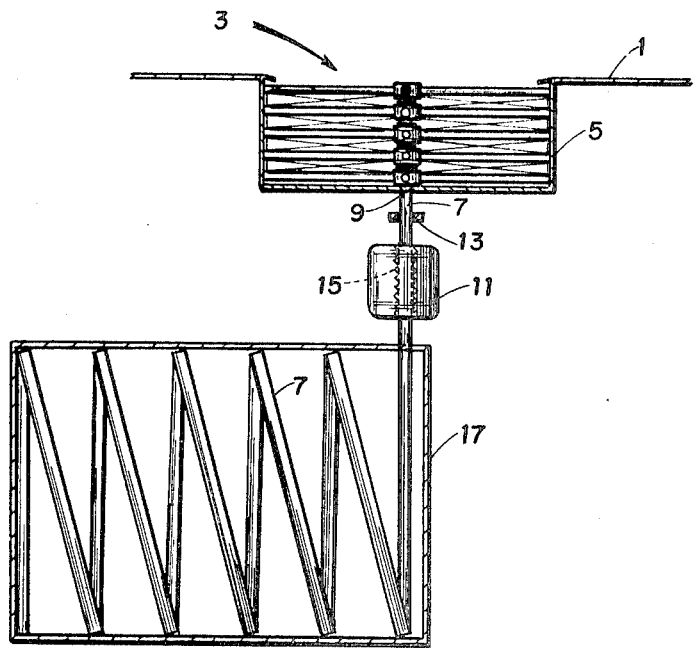
FIG. 1 is a detail section of a portion of a spacecraft having the erectable boom of the present invention in a non-deployed disposition.
Figure 2:
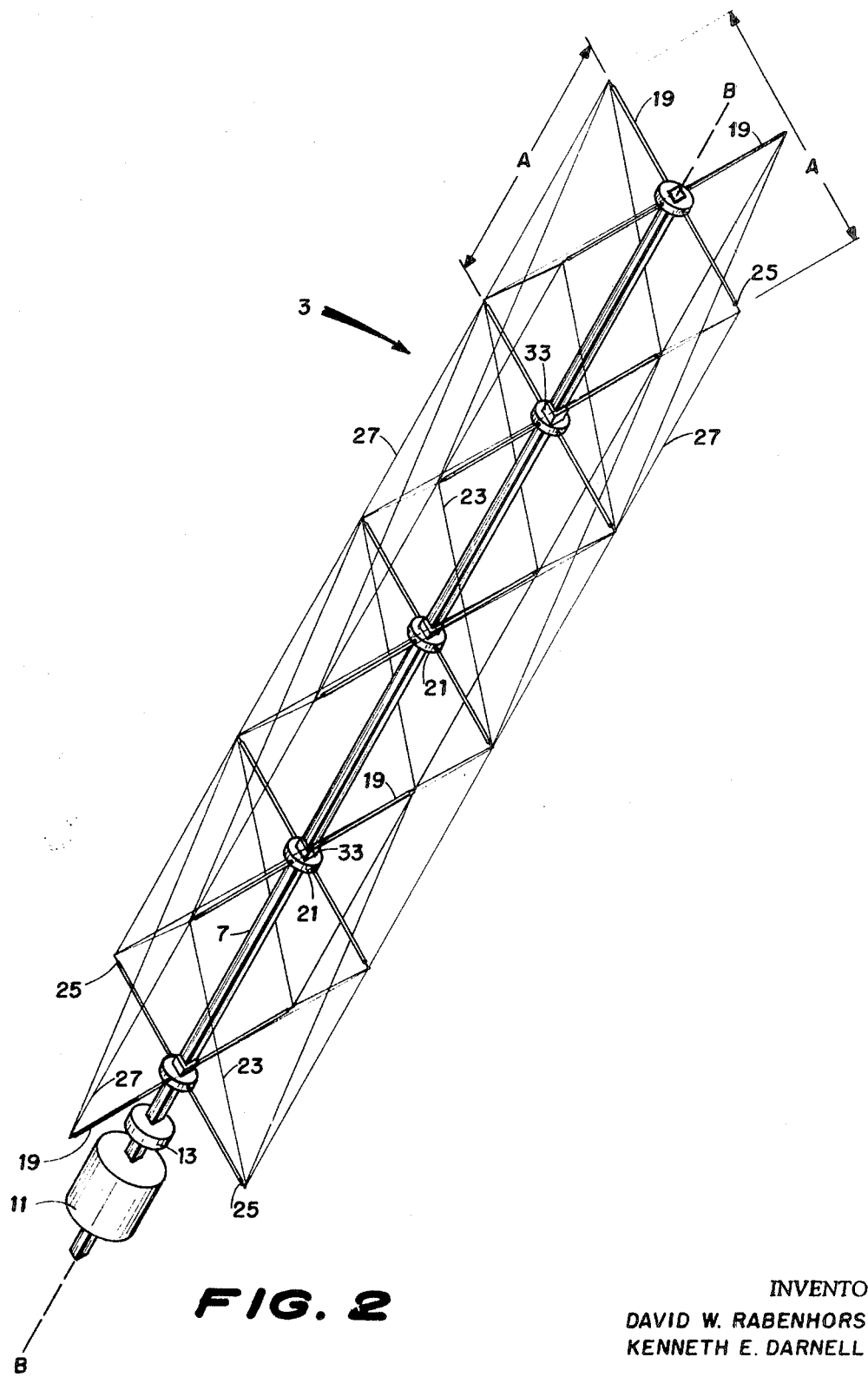
FIG. 2 is a detail section of a portion of a spacecraft showing the erectable boom in a fully deployed configuration.

Referring to the figures and particularly to FIGS. 1 and 2, the boom structure of the present invention is shown in a non-deployed condition aboard a spacecraft in FIG. 1, a portion of the spacecraft body being shown in section at 1. A boom 3 is stowed in suitable housing 5, the boom 3 being further shown, in FIG. 2, in a deployed configuration. A threaded square stem 7, which forms the central support of the boom 3, extends through the center of the stowed boom and exits the housing 5 through a channel guide 9, where it is interfaced with an erection motor 11 by a threaded nut 13 and internally threaded motor shaft 15. The erection motor 11 is light weight, contains no gearing, and is designed to stall at a torque less than the effective yield strength of the boom 3. Such motors are well-known and provide only one of a number of erection devices suitable to use with the present invention. The threaded stem 7 extends through the erection motor 11 into a storage canister 17 where the non-deployed portion of the stem is stowed in a coiled, rolled, or helical configuration. The stem 7 may be constructed of a stiff material, such as 0.045" by 0.045" steel or beryllium-copper, and has a buckling strength less than the effective yield strength of the boom 3. The stem 7 assumes a "natural" longitudinally straight configuration when released from the confinement of the storage canister 17. A number of materials are available which exhibit this required capability.

FIG. 2 illustrates the boom 3 in an extended configuration. The boom is seen to have a simple construction, thereby allowing low weight and mineral stowed volume. The stem 7 supports a spaced series of paired struts 19, the struts 19 of each pair being mutually perpendicular and connected at their inner ends to sleeves 21. The sleeves 21 are slidable along the stem 7 and are spring-loaded to provide interference fitting, that is, to maintain the strut pair in a tensionable relation to the stem and thereby to avoid degradation of boom shape as it is extended. Spring means providing this function will hereinafter be described.

The pairs of struts 19 are preferably spaced along the stem 7 at intervals equal to the cross-sectional diameter A of the boom 3. The pairs of struts 19 are positioned along the stem 7 at a relative angle of zero, that is, when viewing the boom 3 along its longitudinal axis, B—B, only one pair of struts 19 is observable. The struts 19 may be constructed of any stiff material, 0.020" steel or beryllium-copper being preferred in most applications.

Diagonal connecting wires 23, preferably composed of 0.002" diameter steel, Kovar, etc., provide cross support between the struts 19. The diagonal wires 23 provide torsional stiffness and resistance to shear bending. Mutually perpendicular struts 19 of adjoining pairs of struts are joined at their ends 25 by the diagonal wires 23. Thus, each pair of struts 19 is joined to the strut pair on either side by eight of the wires 23. Stated in another way, the boom 3 can be visualized as a rectangular solid having four "faces" having a rectangular shape. When viewing any one of the "faces" of the boom along a line perpendicular to the face, a series of equally-spaced, intersecting diagonals are seen to emanate from the ends 25 of the struts 19. The intersecting diagonals are, of course, the diagonal wires 23.

The bending stiffness of the boom 3 can be greatly increased by the addition of corner wires 27 along the length of the boom 3. Each corner wire 27 connects the ends 25 of each pair of struts 19, such connection being accomplished by four of the corner wires 27. The wires 27 are formed from 0.002" diameter steel or other suitable material. In those applications where high torsional strength is not a requirement, the diagonal wires 23 can be eliminated completely. The boom unit would still have some torsional stiffness, the combined value of the torsional stiffness of all of the wires 27 plus an amount proportional to the sine of the torsional deflection angle. Such a unit would be very simple, having only the four parallel corner wires 27, the center stem 7, and the struts 19.

Figure 3:
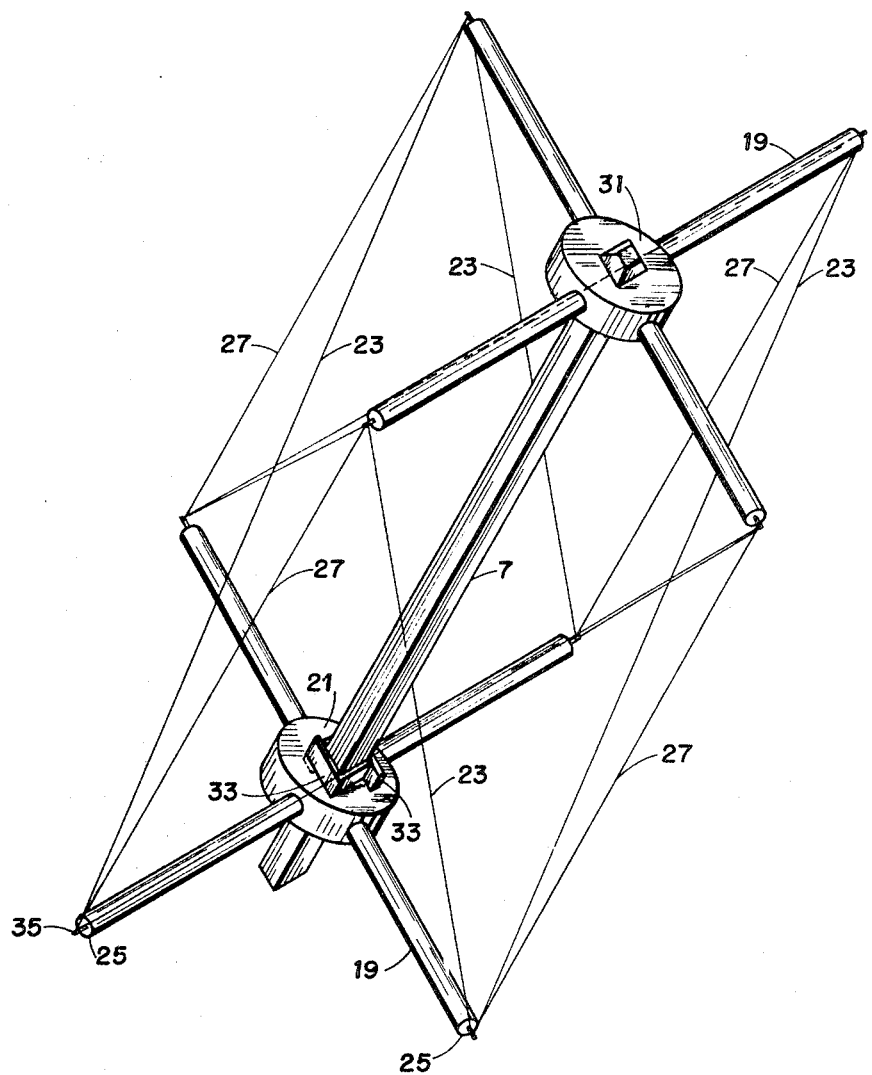
FIG. 3 is an enlarged perspective view of a portion of the boom structure.

The structure of the boom 3 can be seen in greater detail in FIG. 3, which shows the two outermost pairs of struts 19 at the outer end of the boom 3. The free end of the stem 7 is seen to be attached to a terminal sleeve 31. The sleeves 21 which connect the struts 19 are seen to have strips of resilient material, shown here as leaf springs 33, which slidably connect the strut pairs to the stem 7. The force of the springs 33 is necessarily very small since the sleeves 21 must be capable of easy sliding movement along the stem 7, the spring-loaded sleeves 21 simply serving to maintain the strut pairs in the desired positions along said stem.

The outer ends 25 of the struts 19 may be fitted with pivotable connectors 35 for the corner wires 27, the connectors 35 being pivotable on retraction and storage of the boom 3 so that the wires 27 will not be locally deformed to the point of breakage. Of course, the corner wires 27 may be connected directly to the ends 25 of the struts 19 by any of a great number of well-known means. The diagonal wires 23 are each connected directly to the ends of the struts 19, as can be seen in the drawings.

Figure 4:
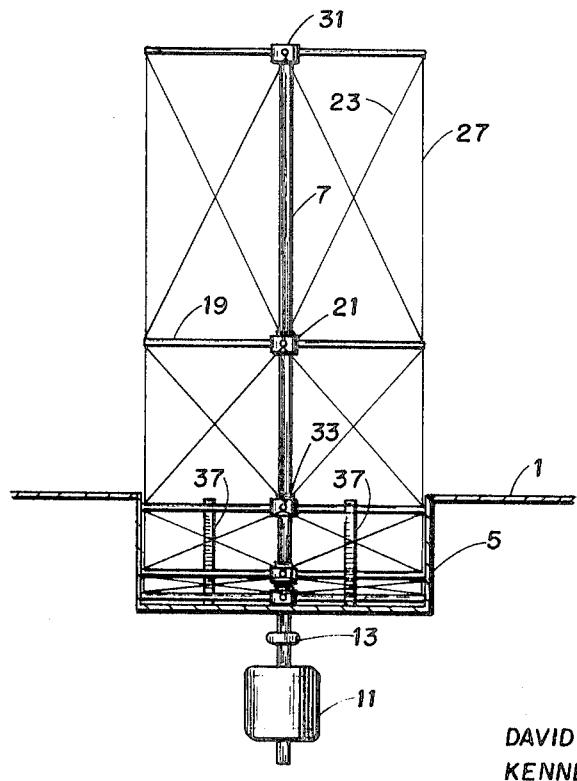
FIG. 4 is an enlarged partial section of the spacecraft, showing the boom in a partially deployed condition.

An object of the invention has been stated to be the provision of a controllably deployable boom which may additionally be retracted. FIG. 4 depicts an enlarged view of the innermost portion of the boom 3 in a partially deployed condition. Resilient stops 37 hold the outermost pair of struts 19 within the housing 5 until sufficient force is provided by the erection motor 11 to bias the stops 37 upward, thus releasing said struts. When desired, the motor 11 may be shut down just prior to the release of a pair of the struts 19, the boom 3 thus being under tension in a partially extended condition. Proper choice of spring constants for the resilient stops 37 will prevent any undesirable "bumping" or vibration on release of the retained pair of struts 19.

As can be easily seen, the dimensions of the boom 3 can encompass a wide range of values for the cross-sectional diameter A. A value of A of six inches will give a boom stiffness several orders of magnitude greater than contemporary booms of comparable dimension. A condition favorable to the proper operation of the boom 3 is that the struts 19 have a resistance to buckling which is greater than the yield strength of the wires 23 and 27. This condition compares with the desirability for the stem 7 to have a bucking strength less than the yield strength of the said wires and for the erection motor 11 to stall at a torque equal to less than the yield strength of the said wires.

Although not shown in the drawings, it should be apparent that wires such as the wires 23 and 27 may be utilized to join adjacent ends 25 of the struts 19 in any strut pair. The provision of such wires is not considered to add appreciable strength of the boom, but may be useful for direct support of a load disposed along the boom. The inventive concept disclosed herein is believed to encompass such modification.

It is to be understood that the invention may be practiced in a manner otherwise than has been expresssly described herein. For example, the use of the invention as an antenna for ground applications will be readily apparent upon interpretation of the invention in light of the appended claims.

What is claimed is:

1. In a spacecraft, a lightweight, erectable boom having a high load supportive capability relative to its weight, having effective immunity to differential expansion caused by solar-initiated thermal stress, and having an essentially shadowless profile after extension from the spacecraft, the boom comprising:

a central supporting stem extending longitudinally and centrally through the boom and occupying a very small spatial portion of the total volume defined and encompassed by said boom;

a series of pairs of mutually perpendicular struts held along the central supporting stem, said pairs being spaced from each other and slidable along the stem, the struts being comprised of thin, rigid rods having a thickness of reduced size relative to the thickness of the stem;

flexible connecting wires joining each end of each strut to the three ends in each adjacent pair of struts most closely spaced from each said end of each said strut, the wires being of a very narrow diameter relative to the struts; and erection means for extending the central stem whereby the pairs of struts are sequentially pulled away from the spacecraft and held along the stem at a spacing determined by the length of the connecting wires, the solid portions of the deployed boom having a small amount of solar radiation incident thereon relative to that radiation incident upon any section taken through the spatial volume defined and encompassed by the boom, said solid portions of the boom being evenly heated by incident solar radiation and evenly dissipating said radiation due to the thickness and disposition thereof.

2. The erectable boom of claim 1 wherein the central supporting stem is comprised of a material selected from the group consisting of steel and beryllium-copper and has a thickness of 0.045 inch.

3. The erectable boom of claim 1 and further comprising pivotable connectors at the ends of the struts for attaching said connecting wires to the ends of the struts.

4. The erectable boom of claim 1 and further comprising means disposed on the spacecraft for tensionally holding said pairs of struts prior to deployment of each of the pairs of struts, each said pair being released by said means on exertion of the force due to the continued extension of the central stem after an adjacent pair of struts has been pulled to full spacing along the stem.

References Cited

UNITED STATES PATENTS

| | | | |
|---|---|---|---|
| 669,492 | 3/1901 | Gill | 52—111 |
| 999,126 | 7/1911 | Sistermann | 52—111 |
| 2,130,993 | 9/1938 | Dubilier | 52—108 |
| 2,269,363 | 1/1942 | Farrand | 52—108 |
| 2,299,687 | 10/1942 | Farrand | 52—108 |
| 2,689,025 | 9/1954 | Yates | 52—111 |
| 2,799,368 | 7/1957 | Alter | 52—108 |
| 3,312,020 | 4/1967 | Schuster | 52—108 |
| 3,457,685 | 7/1969 | Stein | 52—108 |

FOREIGN PATENTS

| | | | |
|---|---|---|---|
| 493,255 | 1919 | France | 52—111 |
| A.D. 598 | 1/1909 | Great Britain | 52—108 |

JOHN E. MURTAGH, Primary Examiner

U.S. Cl. X.R.

52—121